April 6, 1926. 1,580,024
G. M. DRUMMOND
PROCESS IN RECOVERING CALCIUM HYDRATE
Filed Sept. 23, 1924 4 Sheets-Sheet 4

Inventor;
George M. Drummond
By Vernon C. Hodges his Atty.

Patented Apr. 6, 1926.

1,580,024

UNITED STATES PATENT OFFICE.

GEORGE M. DRUMMOND, OF COLORADO SPRINGS, COLORADO, ASSIGNOR TO HOLLY SUGAR CORPORATION, OF COLORADO SPRINGS, COLORADO, A CORPORATION OF NEW YORK.

PROCESS IN RECOVERING CALCIUM HYDRATE.

Application filed September 23, 1924. Serial No. 739,362.

*To all whom it may concern:*

Be it known that I, GEORGE M. DRUMMOND, a citizen of the United States, residing at Colorado Springs, in the county of El Paso and State of Colorado, have invented certain new and useful Improvements in Processes in Recovering Calcium Hydrate, of which the following is a specification.

This invention relates to an improvement in the process of recovering calcium hydrate produced in recovering sugar from molasses, obtained in manufacturing sugar from sugar beets.

The recovery process herein referred to and upon which I have made an improvement is that commonly known as the hydrate process to recover calcium hydrate from the commonly known Steffen's House method to recover sugar from the molasses residue of the final crystallization step of the sugar refining process.

It is an object of my invention to reduce the amount of filter cloth or medium previously necessary in the practice of the hydrate process, and to effect material savings in other portions of the process, notably to reduce the labor heretofore considered essential to the operation of the hydrate process.

The greatest objection to the hydrate process on a plate and frame filter is the enormous consumption of filter cloth, which is frequently as high as thirty square feet of cloth for each ton of hydrate cake produced. Obviously this expensive feature must be eliminated before the process can be practiced on a commercial scale.

I have discovered that this item of expense can be greatly reduced by the use of positive, continuous, pressure or vacuum thickeners, in which the solids contained in the pulp are separated from the liquid by use of a filtering medium, such filtering medium being completely submerged at all times. The solids are removed automatically through a discharge opening in the bottom, while the filtered liquid passes out and to the sugar refining process, of which the molasses is a by-product.

In the process of recovering calcium hydrate from cold saccharate, which is formed in the Steffen's process of recovering sugar from molasses as it is at present performed, plate and frame or other type of filters are employed to separate the liquid from the calcium hydrate. By first permitting the calcium hydrate to be separated from the liquid in positive, continuous, pressure or vacuum thickeners, where the filter cloth or filtering medium is submerged at all times, before it is fed to the filters, a considerable saving in the cost of operating the filters is effected.

This saving of operating expenses relates more particularly to the filter cloths or filtering medium, which by reason of the temperature and caustic action of the hydrate solution and contact with air, deteriorates after a short period of use and must be renewed at frequent intervals, which at present and as previously noted prohibits the use of the hydrate process.

Owing to the comparatively small percentage of moisture contained in a percipitate obtained in the operation of positive, continuous, pressure or vacuum thickeners, above referred to, pressure filters now generally used for freeing the calcium hydrate from liquid, may be eliminated and filtering devices of more simple and economical construction used in the place thereof.

Particularly adapted for use in the process are thickeners of the Genter positive, continuous, pressure or vacuum type as shown, for instance in U. S. Letters Patent 1,359,162.

In Fig. 1 of the drawings is shown diagrammatically a sequence of steps of the above described recovery process, in which the thickening action is included;

Fig. 2 shows a sectional elevation in outline of the Genter, positive, continuous, pressure thickener, hereinbefore referred to;

Figure 2:
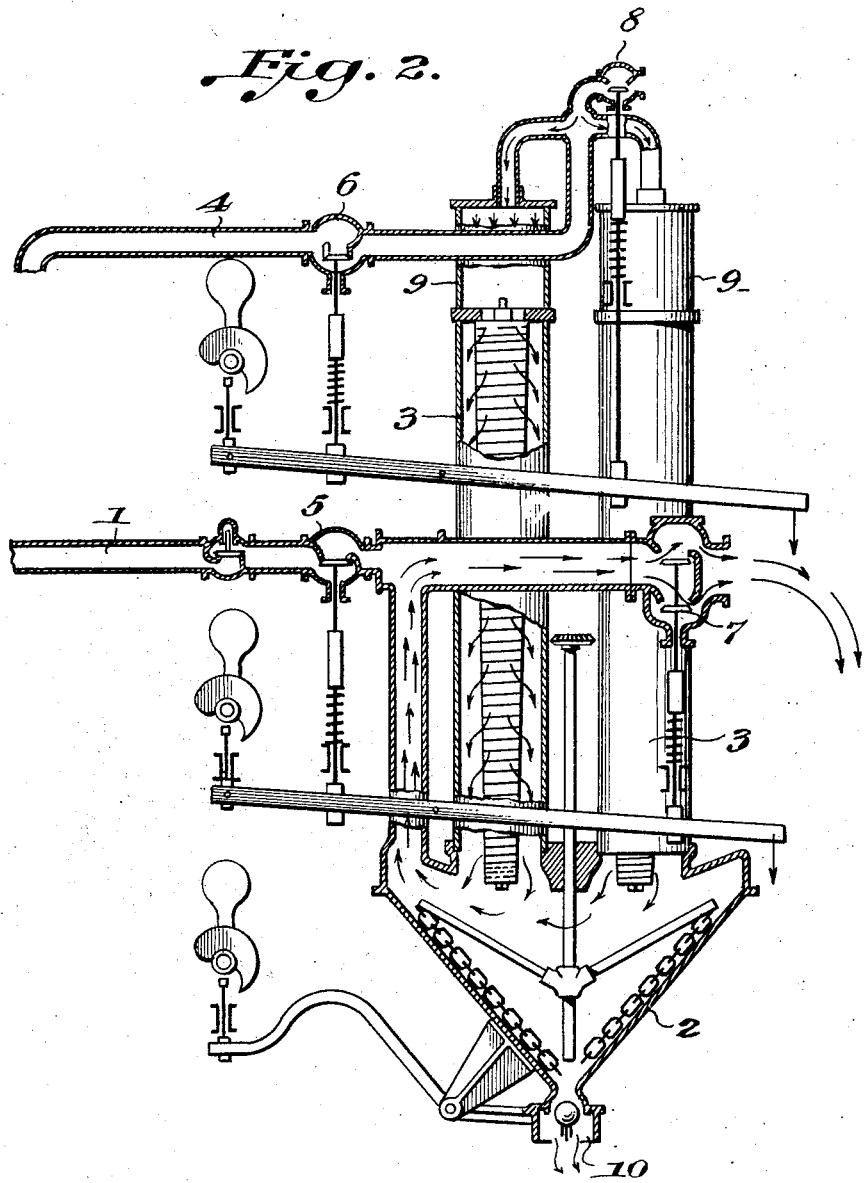

In Fig. 2 of the drawings, showing a sectional elevation in outline of the Genter positive, continuous pressure thickener, the material under treatment is forced through inlet pipe 1 into cone 2, with which are connected four cylinders 3, each cylinder containing a tube covered with filtering medium; the filtered liquor passes out of the top of the tubes through pipe 4. At certain intervals the inlet valve 5 and filtrate valve 6 automatically close and exhaust valve 7 opens and compressed air is admitted through the air valve 8 which forces the juice in the filtrate storage at the top of each tube 9 back through the filtering medium, as indicated by the arrows in Fig. 2 thus cleaning same and the precipitate or mud falls into the cone 2. Spigot 10 opens at certain intervals, discharging the thickened material automatically. All valves are automatic and the filtering medium is submerged at all times as the air blow only lowers the liquor a short distance in the storage chamber above the filtering medium.

Figure 3:
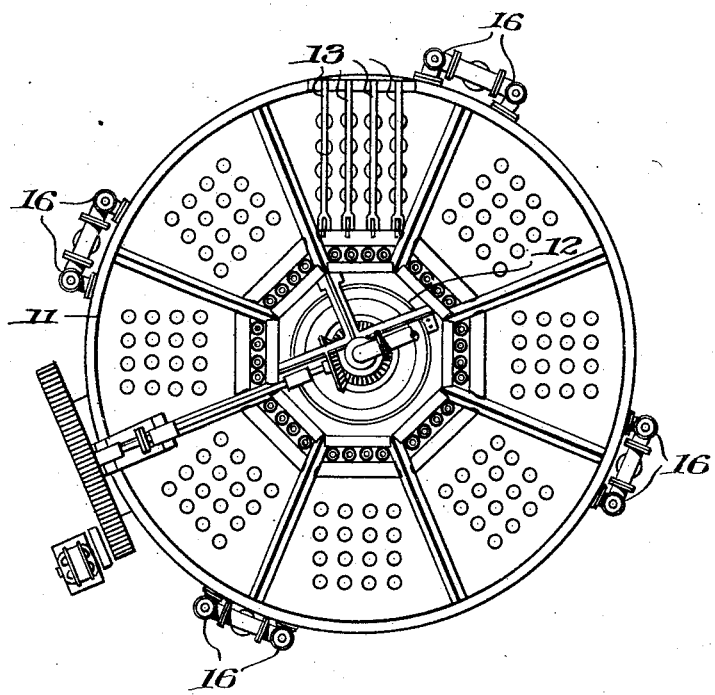
Fig. 3 shows a plan view in outline of the Genter positive, continuous, vacuum thickener.
Figure 4:
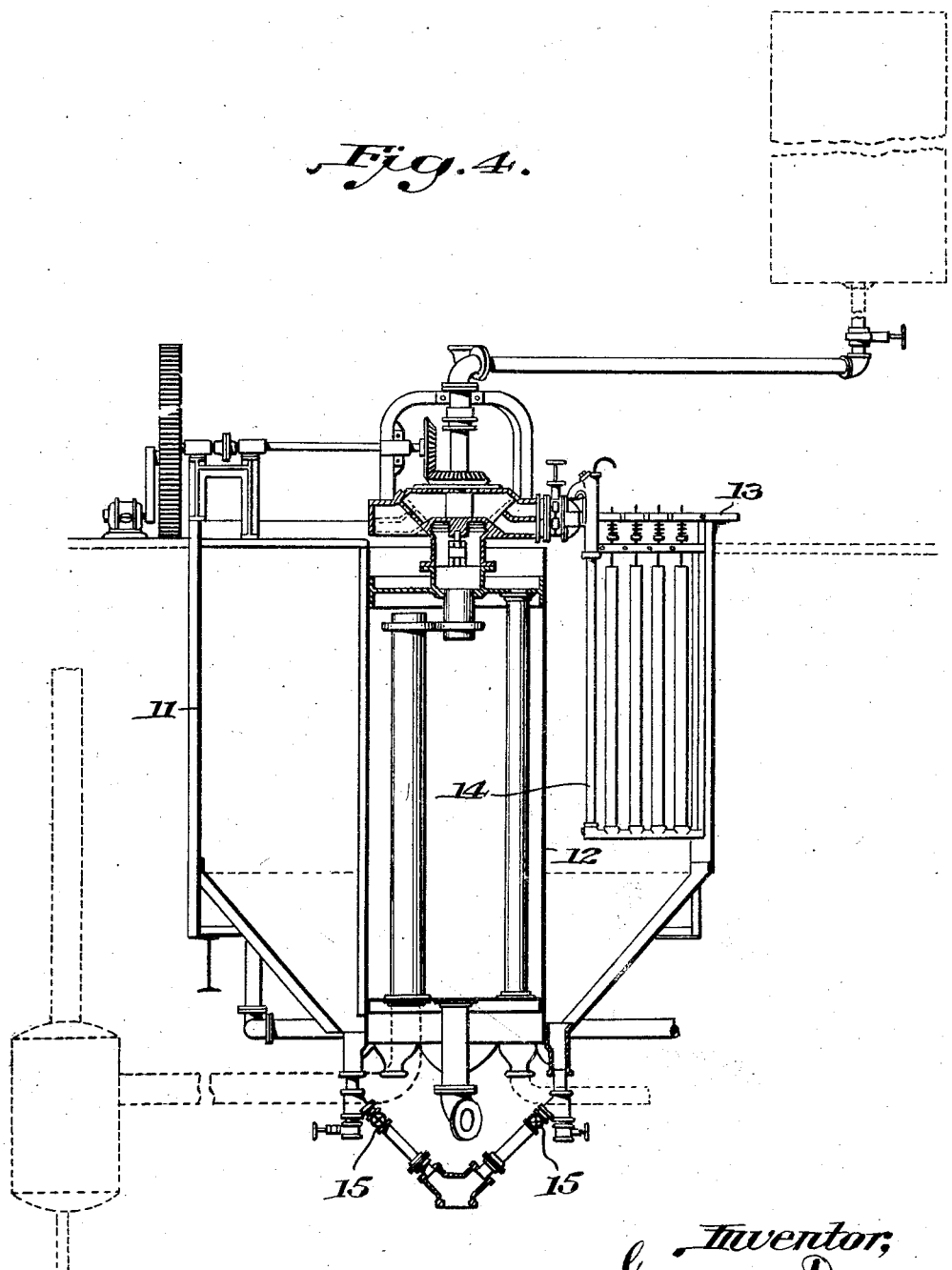
Fig. 4 is a side elevation partly in section of the same thickener.

Figs. 3 and 4 of the drawings show a plan and a sectional elevation in outline of the Genter positive, continuous, vacuum thickener. This thickener as shown is a large open tank 11, having a cone-shaped bottom and tight vacuum receiver 12 in the center of same for filtered liquor. The tank 11 is divided into small independent tanks by partitions, which extend from the inside of tank 11 to outside of receiver 12. Into each small tank or compartment are hung sixteen tubes covered with filtering medium, which are held in four frames 13. The liquor passes through the filtering medium through the pipe 14, which is part of the frame and into the receiver 12, the precipitate collecting on the filtering medium. Vacuum is maintained in receiver 12, which pulls the liquor through the filtering medium. At certain intervals the vacuum valve is automatically closed in one compartment and at the same time a filtered liquor valve is opened, having a hydrostatic head, allowing the liquor to flow back for an instant through the filtering medium, thus cleaning the filtering medium and the precipitate commonly known as cake, drops to the bottom of compartment where valves 15 automatically open at certain intervals, allowing the mud to be pumped to vacuum filters for washing. The unfiltered material enters tanks or compartments at 16 and all compartments in use are kept full at all times, thus allowing the filtering medium to be submerged at all times. The automatic control valve for vacuum and cake discharge rests on top of the receiver and connects with same.

Positive continuous pressure or vacuum thickeners, where the filtering medium is submerged at all times but operating somewhat differently from that shown in the drawings may be used to advantage.

The Steffen's process was devised to recover sugar in molasses residuum from the main beet sugar refining system. The present Steffen's process consists of two steps. First, the recovery of sugar by the cold process which has been generally practiced for some time, and is described in Beet Sugar Making and Its Chemical Control, by Y. Nikaido, edition of 1909, pages 249 to 255 inclusive; in Beet Sugar Manufacture, by Hall and Rolfe, 2nd edition of 1911, pages 248-251 inclusive; and in Beet Sugar Manufacture and Refining, vol. 2 by Lewis F. Ware, edition of 1907, pages 490-501 inclusive.

The second step of the Steffen's process which was developed after the first step had been in operation for some time is described briefly in Beet Sugar Making and Its Chemical Control, supra, page 255, and consists of the so-called Steffen's hot process.

Figure 1:
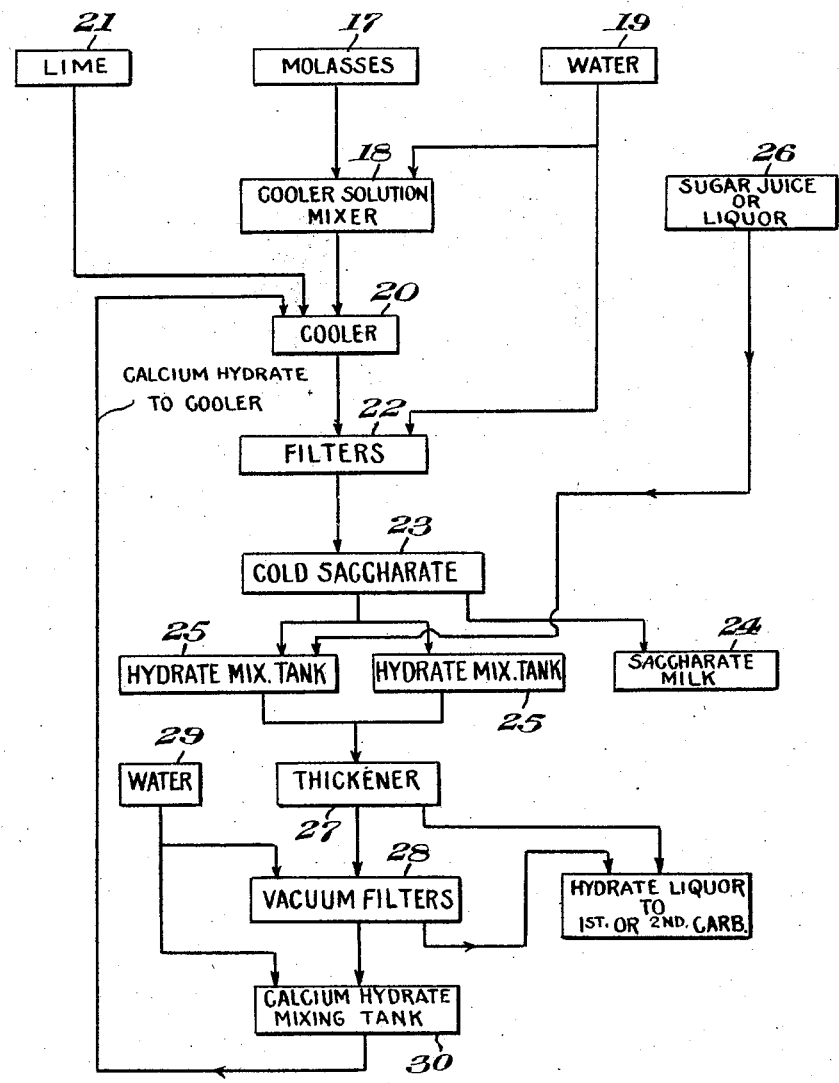

A brief description of the Steffen's cold process for recovering sugar from molasses in the manufacture of sugar from beets is as follows:

Referring to Fig. 1, a certain weight of molasses, which contains approximately 50% sugar in a non-crystallizable state 17, is introduced in cooler solution mixer 18, which contains a certain amount of cold water from 19, this water diluting the molasses so that cooler solution contains approximately 5 to 7% sugar. This is introduced in cooler 20. A certain amount of very fine lime powder is added to this dilute molasses from powdered lime bin 21 and while lime is being added, the solution is circulated through cooling tubes, jacketed with cold water, the lime thus added forming a chemical combination with the sugar and precipitating out tricalcium saccharate, commonly called cold saccharate. The amount of lime powder added ranges from 90 to 130% in weight of sugar in the molasses. After all the lime is added the "finished cooler solution" is pumped from the coolers to the cold saccharate filters 22 where the insoluble cold saccharate is separated from the waste water. This cold saccharate 23 is mixed in tanks 24 with filtered juice or sweet water from first carbonation, heated, the resulting mixture being called saccharate milk, and a certain amount of this saccharate milk is added to each tank of first carbonation to purify the beet juice. This concludes the brief description of Steffen's process used in a great many beet sugar factories. The Steffen's hot process will not be explained here as it does not enter into this application.

A description of the hydrate process for recovering calcium hydrate from the cold saccharate to which my invention pertains is as follows:

Part of the cold saccharate, 23, is taken to mixing-tank 25 and treated with a certain amount of sugar juice or liquor 26, diluting the same to a brix of approximately sixteen degrees and upwards, varying with local conditions at the time of refining, heated to a temperature of from 65 to 90 degrees centigrade, and as a result the insoluble, tri-calcium saccharate is broken up into soluble mono-calcium saccharate and calcium hydrate. This mixture of calcium hydrate and hydrate liquor is filtered in common type of plate and frame filter presses or other types of pressure filters and the filtrate containing the sugar is added to either first or second carbonation in the regular process of extracting sugar from beets. The insoluble calcium hydrate is washed with water from 29 and the pure hydrate is dropped into a mixing tank 30, where cold water is added from 29, diluting same to proper density and the resulting milk of lime pumped to the cooler solution mixer 18 or to the coolers 20, where an amount equal to approximately 20 to 30% of the lime added to coolers is introduced in this form, prior to adding the powdered lime, thus reducing the actual amount of lime powder to coolers approximately this amount.

An important phase of my improvement in the hydrate process is in the filtering of the hydrate solution after 25. Plate and frame presses or similar presses have been used where the hydrate has been filtered through filter cloth; the hydrate cake washed in the same filter presses and the press opened and hydrate cake removed, allowing the filter cloth to come in contact with the air each time the press is opened to remove the hydrate cake. Deterioration of the filter cloth due to caustic action of calcium hydrate and contact with air causes the renewal of filter cloth too frequently and thus makes the cost of operating the present hydrate process prohibitive. I have demonstrated that by keeping the filter cloth or filtering medium entirely submerged at all times, the life of the cloth or filtering medium is greatly increased, so to attain my object in place of filtering through filter press direct from 25, the hydrate solution is forced through a positive continuous vacuum or pressure thickener 27, the thickened calcium hydrate then sent to vacuum filters 28, where it is washed free from sugar, etc. From these filters the hydrate cake drops in 30 and from 30 is returned to coolers 20, as described before.

By employing thickeners as above described to separate the sludge from the liquid in the so-called hydrate process, I have effected an important improvement therein, and have considerably lessened the operating expenses which are incident upon the use of filter presses now commonly employed at this stage in the process of recovering calcium hydrate from saccharate in the Steffen's process of recovering sugar from molasses in the process of beet sugar manufacture. The elimination of the common type of pressure filters also results in a saving in labor as well as the large saving in filtering material.

Having thus described my invention, what I claim and desire to secure by Letters Patent is:

1. In a process of recovering calcium hydrate from cold saccharate obtained in a process of recovering sugar from molasses obtained in the manufacture of sugar from sugar beets, the method of separating calcium hydrate from a liquid in intermixture therewith, which comprises continuously introducing the liquid mixture into what is known as positive pressure or vacuum thickeners, the clear liquid continuously flowing from same and removing the precipitate from the bottom and filtering the precipitate, the filtering medium in said thickener being completely submerged at all times.

2. In a process of recovering calcium hydrate from cold saccharate obtained in a process of recovering sugar from molasses obtained in the manufacture of sugar from sugar beets, the method which comprises mixing the cold saccharate with sugar juice or liquor, heating, converting the cold saccharate into soluble mono-saccharate and insoluble calcium hydrate, continuously introducing the resulting mixture of solids and liquid into what is known as positive continuous pressure or vacuum thickeners, the clear liquid continuously flowing from same and removing the precipitate from the bottom and filtering and washing the precipitate, the filtering medium in said thickener being completely submerged at all times.

3. In a process of recovering calcium hydrate from cold saccharate obtained in a process of recovering sugar from molasses obtained in the manufacture of sugar from sugar beets, the method which comprises mixing the molasses with lime powder, cooling the mixture, filtering it, mixing cold saccharate precipitate obtained with sugar juice or liquor, heating, converting the cold saccharate into soluble mono-saccharate and insoluble calcium hydrate, continuously introducing the resulting mixture of solids and liquid into what is known as positive, continuous, pressure or vacuum thickeners, the clear liquid continuously flowing from same and removing the precipitate from the bottom and filtering and washing the precipitate in well known types of vacuum filters, the filtering medium in said thickeners being completely submerged at all times.

4. In a process of recovering calcium hydrate from cold saccharate obtained in a process of recovering sugar from molasses obtained in the manufacture of sugar from sugar beets, the method which comprises mixing the molasses with lime powder, cooling the mixture, filtering it, mixing the cold saccharate precipitate obtained with sugar juice or liquor, heating, converting the cold saccharate into soluble mono-saccharate and insoluble calcium hydrate, continuously introducing the resulting mixture of solids and liquid into positive continuous pressure or vacuum thickeners, the clear liquid continuously flowing from same and removing the precipitate from the bottom and filtering and washing the precipitate in well known types of vacuum filters, the filtering medium in said thickeners being completely submerged at all times, mixing the washed calcium hydrate with water and returning a certain amount to each cooler prior to adding the lime powder.

5. The process of recovering sugar from molasses obtained in the manufacture of sugar from sugar beets, which consists in adding lime to the molasses, precipitating out tri-calcium saccharate, filtering out the tri-calcium saccharate from the waste water, adding sugar juice or liquor to the tri-calcium saccharate, heating the mixture, converting it into mono-calcium saccharate and calcium hydrate, filtering by introducing the liquid continuously into continuous pressure or vacuum filters in which the filters are continuously submerged in the liquid, and in which the clear liquid is continuously drawn off and introduced into the carbonation step of the sugar making process, and in which the precipitate is drawn off, the calcium hydrate being then mixed with water, and introduced into the molasses in place of a portion of the lime used to start the process.

6. As a step in the method of recovering sugar from molasses by the Steffen's process, filtering the caustic solution in a continuous vacuum or pressure thickener in which the filter is submerged at all times during the operation of the thickener.

In testimony whereof I affix my signature.

GEORGE M. DRUMMOND.